April 24, 1956 K. E. MEYER 2,743,230
MANIFOLD FOR WATER CONDITIONING AND FILTERING UNITS
Filed May 12, 1954
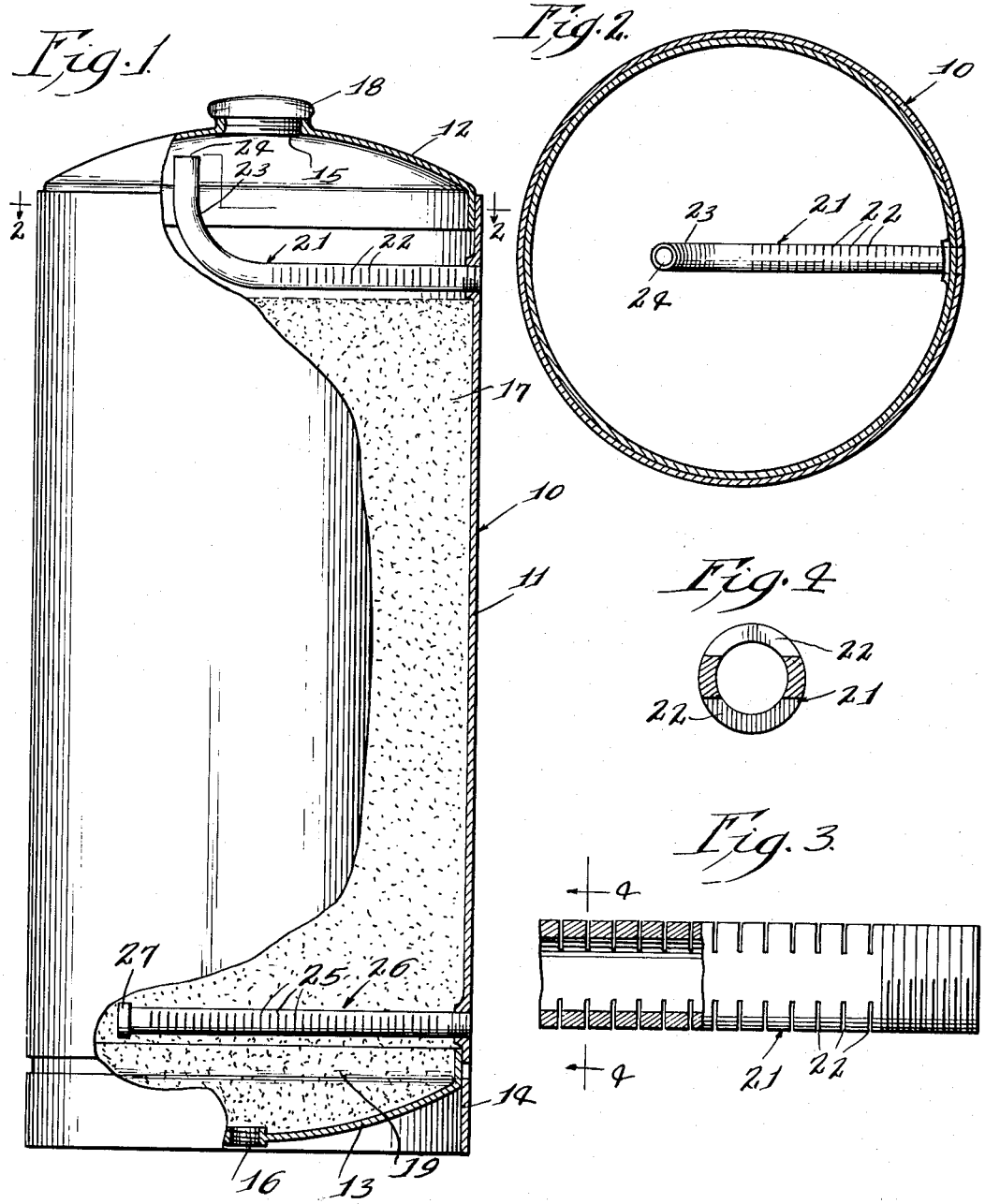
Inventor.
Kenneth E. Meyer.
By. Wilson & Eppert
Attorneys.

United States Patent Office 2,743,230
Patented Apr. 24, 1956

2,743,230

MANIFOLD FOR WATER CONDITIONING AND FILTERING UNITS

Kenneth E. Meyer, Libertyville, Ill., assignor to Culligan, Inc., Northbrook, Ill., a corporation of Delaware Application May 12, 1954, Serial No. 429,218

2 Claims. (Cl. 210—24)

The present invention relates to water conditioning and filtering units and the like and more particularly to a novel manifold for use in such units.

In water conditioning units of the type disclosed, there is provided a tank containing a relatively deep stratified bed of granular material in the form of loosely packed solid particles of ion exchange materials which may be either those occurring in nature or those produced synthetically such as resinous exchange materials, and a layer of relatively fine gravel and a layer of relatively coarse gravel in the bottom of the tank. Such materials for the treating or conditioning and filtering of water or liquid to be treated are insoluble in the liquid with the exchange materials possessing active portions capable of reacting or exchanging with dissolved ionizable matter in the liquid to be treated.

During water softening, conditioning or ion exchange operation, the active portions of the ion exchange materials become inactivated by ion exchange to a point of exhaustion normally defined as that point where the quality of the effluent is no longer suitable for the purpose or use intended. When such ion exchange materials reach or substantially reach the point of exhaustion, it is necessary to reactivate these materials by the process or method known as regeneration in which such ion exchange materials are treated with a predetermined amount of a regenerant.

In the process of regeneration, the exchange minerals or materials in the conditioning and filtering tank are first backwashed in which raw or untreated water is caused to flow through the bed of materials in the tank in a direction reverse to that of the flow of the water during normal conditioning and filtering operation. The purpose of this backwashing cycle is to loosen, cleanse and stratify the exchange bed and to free the bed of any accumulated and filtered solids in order to properly prepare the bed of exchange materials for regeneration. This reverse flow expands the exchanger bed into the free space provided in the tank of the conditioning unit after which the minerals are ready for the regeneration or brining cycle.

In the regeneration or brining cycle, salt or a suitable regenerant is added to the normally free space in the top of the tank, and during this cycle the brine or regenerant is caused to flow downwardly through the bed of materials in the tank and outwardly through a manifold or outlet in the bottom of the tank to drain as spent regenerant. Upon complete removal of all regenerant from the tank by the passage of rinse water for a predetermined period of time through the bed of regenerated exchange materials and passing the effluent to drain, the regenerated exchange materials are ready for the return of the water conditioning unit to normal service operation.

The present invention comprehends the provision of a novel upsweep manifold or distributor functioning as the inlet through which the raw water or liquid to be treated enters the water conditioning tank and from which manifold this raw or untreated water flows through the bed of conditioning or treating minerals to the outlet manifold adjacent the bottom of the tank during normal service operation, but which inlet manifold functions as the outlet for the effluent during the backwashing cycle in the regeneration of the ion exchange materials.

An important object of the present invention is the provision of a novel manifold assembly having a substantially horizontal portion or leg provided with a plurality of relatively narrow slots or openings for the passage therethrough of water but preventing the passage therethrough of particles of minerals, and an upwardly bent leg or upturned projection open at its end for the uninterrupted passage of water. After the minerals in the bed have been backwashed and cleansed, these fine slots permit water in the upper portion of the tank to drain therethrough down to the level of these slots and thereby provide proper space and allow for the addition of regenerant without spilling water.

A further important object of the present invention is the provision of a novel manifold construction for use in a water conditioning and filtering unit whereby the ion exchange capacity of the tank is substantially increased. More particularly, in water conditioning units of the type adapted to be regenerated in situ, sufficient free board or riser space must be provided above the normal top of the mineral bed for the entry of the salt or regenerant when the minerals have become inactive or exhausted for the purpose intended and require regeneration. In order to retain the minerals composing the relatively deep bed of exchange materials within the tank and particularly to prevent the smaller or relatively fine particles from passing with the effluent to drain through the manifold during the backwashing cycle or operation, it has been necessary in prior units to locate the top or height of the bed of minerals sufficiently below the then outlet or manifold that as the minerals rise in the tank during backwashing, the maximum height to which such minerals are permitted to rise is sufficiently below the outlet of the manifold to prevent the passage and escape of any minerals with the effluent.

In the present novel manifold which forms the inlet for the raw or untreated water during normal service operation as well as during brining or regeneration and rinsing, but forms the outlet during the backwashing cycle, the quantity and the depth of the bed of minerals may be very substantially increased over such prior units and thereby substantially increase the capacity of the conditioning and filtering unit. Thus during the backwashing cycle when the flow of water through the tank is reversed to remove any accumulated particles filtered out, the minerals in the upper portion of the bed and the height of which bed in normal operation may extend to adjacent the horizontal slotted portion, cannot pass outwardly through the slots in the manifold with the effluent. So long as the minerals during backwashing do not rise to the level of the opening in the upwardly projecting leg of the manifold, they are retained in the tank.

Further objects are to provide a construction of maximum simplicity, efficiency, economy and ease of assembly and operation, and such further objects, advantages and capabilities as will later more fully appear and are inherently possessed thereby.

In the drawing:

Figure 1 is a view part in vertical cross section and part in side elevation of a water conditioning unit embodying the novel manifold construction.

Fig. 2 is a view in horizontal cross section taken in a plane represented by the line 2—2 of Fig. 1 and viewed in the direction of the arrows.

Fig. 3 is an enlarged fragmentary view, part in vertical cross section and part in side elevation of the end of the manifold that is attached to the tank.

Fig. 4 is a cross sectional view taken in a plane represented by the line 4—4 of Fig. 3 and viewed in the direction of the arrows.

Referring more particularly to the disclosure in the drawing and to the novel embodiment therein selected to illustrate the present invention, there is shown a water conditioning and filtering unit 10 including a tank 11 which may be constructed of metal, of a plastic composition or of other material suitable for the purpose, and and provided with a head or top 12, a bottom 13 and a supporting base 14 adapted to support the tank above the floor or other surface on which it is placed or mounted. A suitable opening 15 is provided in the top or head and a smaller opening 16 is provided in the bottom and adapted to be closed by a removable plug.

The relatively large opening 15 is adapted for supplying the tank with a bed of minerals or water treating and filtering material 17, and also for supplying to the upper portion of the tank salt or regenerant when regeneration of the minerals in the bed 17 is required. A removable cap 18 provides a closure for the opening 15. The smaller opening 16 in the bottom 13 is adapted for drainage upon removal of its plug or closure. The bed 17 of minerals or water treating and filtering material generally consists of a relatively deep stratified bed of loosely packed solid particles including ion exchange material, which may be either those occurring in nature or those produced synthetically, such as resinous exchange material, and beneath such ion exchange materials in the bottom of the tank at 19 there may be provided an upper layer of relatively fine gravel and a lower layer of relatively coarse gravel.

Into the tank 11 projects an inlet manifold 21 which may be of metal or of a suitable plastic or other composition having sufficient rigidity and suitable for the purpose. It is formed or provided with a substantially horizontal portion or leg having multiple and relatively closely spaced narrow slots or openings 22 and an upturned or upwardly projecting leg 23 open at its upper end 24 for the uninterrupted passage of water. Raw or untreated water entering this inlet manifold 21 from the exterior of the tank may pass through these narrow slots 22 and through the upper open end 24 and then downwardly through the relatively deep stratified bed 17 of ion exchange materials, and then through spaced narrow slots or openings 25 into an outlet manifold 26 which is closed or capped at its inner end 27 to limit the passage of the treated water into the outlet manifold solely through the slots 25. Treated water entering the outlet manifold 26 passes into the service line for use.

As the bed of ion exchange material 17 becomes exhausted or inactive, regeneration thereof is required. To accomplish such regeneration, raw or untreated water, normally entering the inlet manifold 21, is by-passed to flow in the reverse direction through the tank and is directed through the manifold 26 in the bottom of the tank which is normally the outlet for the treated water. From the manifold 26, the untreated or raw water passes upwardly through the bed of materials 17 with the effluent entering the manifold 21 through the opening 24 in the upper end of the leg 23 and also through the slots 22, and is discharged to drain. Control of the water entering and leaving the tank 11 and for reverse flow is through suitable valve and control mechanism with which the water conditioning unit is equipped. The size and arrangement of the slots 22 in the manifold 21 (the inlet manifold except during the backwashing cycle) and the slots 25 in the manifold 26 (the outlet manifold except during backwashing when the water enters therethrough), are such that the particles of exchange materials are filtered out and cannot pass therethrough.

As the particles of ion exchange materials in the bed 17 during this reverse flow or backwashing cycle are loosened, cleansed and stratified preliminary to regeneration in situ, those in the upper portion of the tank may rise with the cleansing water flowing in a direction reverse to that of normal flow to a level substantially above the horizontal leg of the manifold 21 but below the upper opening 24 in the upsweep end or upright leg 23 of this manifold, it will be appreciated that the maximum depth of the bed 17 may rise to a substantially greater height than possible with the usual inlet manifold for so-called permanent types of installation having an inwardly projecting leg in a side wall of the tank through which the effluent must enter during backwashing and in which any openings or slots must be of a size sufficiently large to effectively carry off the effluent. Thus in such prior type of manifold, openings of the size required for effective backwashing would permit the escape of some of the minerals or ion exchange materials, whereby the effective height of the bed for normal operation must be maintained sufficiently below the usual inlet manifold that during backwashing none of the relatively expensive minerals will be lost with the effluent.

After completion of the backwashing cycle in which the exhausted minerals are expanded by the water entering through the manifold 26 with the effluent leaving the top of the tank 11 through the manifold 21, and the supply of water for that purpose has been stopped, the cap 18 is removed to permit the entrance of air to the top of the tank whereupon remaining water or effluent drains from the upper portion of the tank through the narrow or fine slots 22 down to the level of these slots in the inlet manifold 21. This permits salt or regenerant to be added to the top of the tank through the opening 15, after which the cap 18 is replaced and water is permitted to enter and flow through the inlet manifold 21, down through the bed of minerals in the tank 11 and to exit through the outlet manifold 26 to drain.

After regeneration and subsequent rinsing of the minerals has been accomplished and the effluent passed to drain through the outlet manifold 26, the unit is again ready for service operation by connecting the outlet manifold to the service line for supplying softened or conditioned and filtered water for use.

From the above description and the disclosure in the drawing, it is believed evident that the present invention comprehends a novel construction of manifold for a permanently installed down-flow type of water conditioning and filtering unit, which manifold provides an inlet for the raw or untreated water during normal service operation and an outlet for the effluent during the backwashing cycle when the bed of minerals is being regenerated. By reason of its novel construction and arrangement, the tank may be supplied with a greater depth and quantity of ion exchange materials than is possible with tanks of similar dimensions employing the prior construction of manifold.

Having thus disclosed the invention, I claim:

1. In a water conditioning and filtering unit including a tank having a bed of ion exchange materials for conditioning raw or untreated water and provided with an outlet manifold in the lower portion of the tank, an inlet manifold mounted in the upper portion of the tank through which the raw or untreated water enters prior to passage downwardly through the bed of ion exchange materials, said inlet manifold consisting of a part projecting laterally and substantially horizontally into the tank and provided at its inner end with an upwardly projecting leg bent upwardly from the laterally projecting part and extending to approximately the top of the tank and thereat having an open end, and multiple narrow slots in the laterally projecting part and spaced a substantial distance below said open end, said inlet manifold providing a passage for the discharge of the effluent when backwashing the ion exchange materials by passing water upwardly through the bed of materials from the outlet manifold to loosen, cleanse and stratify these materials, and the narrow slots providing a drain through which the water or effluent above these slots drains upon completion of backwashing to provide space for the addition of a regenerant to the top of the tank.

2. In a water conditioning and filtering unit including a tank having a deep bed of minerals including ion exchange materials for conditioning raw or untreated water and provided with an outlet manifold in the lower portion of the tank projecting into the bed of minerals, an inlet manifold mounted in the upper portion of the tank through which the raw or untreated water enters prior to passage downwardly through the bed of minerals, said inlet manifold consisting of a conduit projecting laterally from the side wall of and into the tank adjacent the top of the bed and provided at its inner end with an upwardly projecting leg extending above the bed to approximately the top of the tank and thereat having an open end, and multiple slots in the laterally projecting part of such size as to permit the passage of water or effluent therethrough but prevent the passage therethrough of the minerals at the top of the bed during backwashing when the bed of minerals is expanded and rises to a height above said slots but beneath the open end, and effects drainage of the effluent above said slots upon completion of backwashing to provide space for the addition of a regenerant to the top of the tank.

References Cited in the file of this patent

UNITED STATES PATENTS

| | | |
|---|---|---|
| 1,423,132 | Magrath | July 18, 1922 |
| 1,784,893 | Duden | Dec. 16, 1930 |
| 1,873,594 | Johnson | Aug. 23, 1932 |
| 1,962,663 | McGill | June 12, 1934 |
| 2,304,109 | McGill | Dec. 8, 1942 |
| 2,589,136 | Ralston | Mar. 11, 1952 |